United States Patent [19]

Weers

[11] Patent Number: 5,074,991

[45] Date of Patent: Dec. 24, 1991

[54] SUPPRESSION OF THE EVOLUTION OF HYDROGEN SULFIDE GASES

[75] Inventor: Jerry J. Weers, Ballwin, Mo.

[73] Assignee: Petrolite Corporation, St. Louis, Mo.

[21] Appl. No.: 525,796

[22] Filed: May 18, 1990

Related U.S. Application Data

[63] Continuation-in-part of Ser. No. 310,420, Feb. 13, 1989, abandoned.

[51] Int. Cl.$^5$ .............................................. C10G 29/20
[52] U.S. Cl. ..................................... 208/236; 208/14; 208/47; 208/348; 208/370; 44/333; 44/340; 44/353; 44/432; 44/433; 210/749; 210/750; 210/757; 210/758; 252/148; 252/390; 252/394
[58] Field of Search ............... 210/749, 750, 757, 758; 208/47, 14; 252/8.555; 44/333, 340, 353, 432, 433, 353

[56] References Cited

U.S. PATENT DOCUMENTS

| | | | |
|---|---|---|---|
| 3,816,333 | 6/1974 | King et al. | 252/8.555 |
| 3,928,211 | 12/1975 | Browning et al. | 252/8.555 |
| 4,350,600 | 9/1982 | Sharp et al. | 252/8.555 |
| 4,460,482 | 7/1984 | Wu | 252/8.555 |
| 4,900,458 | 2/1990 | Schroeder | 252/8.555 |
| 4,938,925 | 7/1990 | Peterson | 252/8.555 |
| 4,957,640 | 9/1990 | Treybig et al. | 252/8.555 |
| 4,978,366 | 12/1990 | Weers | 44/334 |

Primary Examiner—Helane E. Myers
Attorney, Agent, or Firm—Jeffrey S. Boone; Kenneth Solomon

[57] ABSTRACT

Hydrogen sulfide gas evolution from water or hydrocarbons, especially during storage or transport of petroleum residua is suppressed by the incorporation of an effective amount of a diamine of the formula

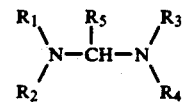

wherein $R_1$, $R_2$, $R_3$, and $R_4$ are independently an alky radical containing 1 to 14 carbon atoms, $(CH_2)_n$—$OR_6$ or cycloalkyl containing 5 or 6 carbon atoms and $R_5$ is hydrogen or methyl. $R_1$ and $R_2$ and $R_3$ and $R_4$ can be alkylene groups joined together with their respective adjacent N to form a heterocyclic ring. $R_6$ is hydrogen or an alkyl radical having 1 to 5 carbon atoms and n is an integer of 1 to 5.

36 Claims, No Drawings

SUPPRESSION OF THE EVOLUTION OF HYDROGEN SULFIDE GASES

CROSS REFERENCE TO RELATED APPLICATIONS

This application is a continuation-in-part of co-pending U.S. patent application Ser. No. 07/310,420, filed 1989 Feb. 13 now abandoned, which co-pending application is incorporated herein by reference.

FIELD OF THE INVENTION

The present invention relates to the removal or suppression of hydrogen sulfide from hydrocarbons or water. In particular, the invention relates to such removal or suppression by chemical means.

BACKGROUND OF THE INVENTION

In the drilling, production, transport, storage, and processing of crude oil, including waste water associated with crude oil production, and in the storage of residual fuel oil, hydrogen sulfide, which is a very toxic substance, is often encountered. Also, at the oil well head, hydrogen sulfide-containing light hydrocarbon vapors are emitted and must be controlled. Uncontrolled emission of hydrogen sulfide gives rise to severe health hazards. Burning of such vapors neither solves the toxic gas problem nor is economical since the light hydrocarbons have significant value. Furthermore, hydrogen sulfide is often present in the underground water removed with the crude oil, in the crude oil itself and in the gases associated with such water and oil. When the water and oil are separated one from the other by the use of separation tanks, demulsification apparatus and the like, intolerable amounts of hydrogen sulfide are emitted as a gas which is associated with water and hydrocarbon vapors. Natural gases are often sour; that is they contain some hydrogen sulfides.

In accordance with the present invention, hydrocarbon liquids containing hydrogen sulfide, as well as hydrocarbon gases, such as natural gas or off gases from the production, transport, storage, and refining of crude oil can be controlled in a convenient and economical manner.

The present invention is particularly useful in the control of hydrogen sulfide from petroleum residua. A crude oil residuum or heavy oil which is often referred to as asphaltic fractions in the refining of crude oil is broadly understood to be the residue obtained from crude oil after a nondestructive distillation has removed substantially all of the volatile fractions. Refining temperatures are usually maintained below 350° C. (660° F.) as the rate of thermal decomposition of petroleum becomes substantial above such temperature. Residua are black, viscous materials and are obtained as a residue from atmospheric or vacuum distillation of a crude oil. They may be liquid at room temperature (generally atmospheric residua) or almost solid (generally vacuum residua) depending upon the crude oil. The organic chemical composition of residua are complex and may contain ash-forming metallic constituents and sulfur compounds, since metals and sulfur compounds of one type or another are generally present in crude oil. In residua, there are many varieties of sulfur compounds depending on the prevailing conditions during the formation thereof. The presence of the sulfur compounds in the residua gives rise to the generation of a gas having substantial portions of hydrogen sulfide gas. Residua have found extensive use as a bunker fuel oil, No. 6 fuel oil, fuel oil C, and marine fuel oil. Residua must be transported from the refinery to the points of use, such as a ship or power generating plant. Unfortunately, during storage or such transport, hydrogen sulfide gases become liberated and give rise to a multitude of environmental problems.

Hydrogen sulfide is a very toxic gas and thus the use of residua requires special handling to ensure safety. The contamination of residua with hydrogen sulfide forming substances thus presents a series of problems as the residua are stored or transported. Providing an effective chemical method for suppressing or inhibiting the liberation of hydrogen sulfide gases from residua are of considerable importance. Methods heretofore known for suppressing the liberation of hydrogen sulfide gases from residua suffer from the standpoint of effectiveness.

SUMMARY OF THE INVENTION

The present invention relates generally to hydrocarbons or water and particularly to petroleum residua containing hydrogen sulfide gas forming substances, and to a method for chemically suppressing the liberation of the hydrogen sulfide gases from such materials. The suppression or inhibiting of the generation of the hydrogen sulfide gases is accomplished by incorporating into the material at least one of the following diamine compounds in an amount sufficient to inhibit hydrogen sulfide gas evolution:

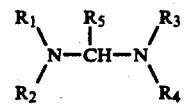

wherein $R_1$, $R_2$, $R_3$, and $R_4$ are each independently an alkyl radical containing 1 to 14 carbon atoms, $(CH_2)_n$—$OR_6$ or cycloalkyl containing 5 or 6 carbon atoms and $R_5$ is hydrogen or methyl. $R_6$ is an alkyl having 1 to 5 carbon atoms and n is an integer of 1 to 5. $R_1$ and $R_2$ or $R_3$ and $R_4$ or both can be joined to form a five or six member heterocyclic ring. Such ring can also include hetero atoms such as N, O, or S in addition to the N to which $R_1$ and $R_2$ and/or $R_3$ and $R_4$ are respectively joined. By including a diamine compound of the above general structure within material in an amount of about 10 ppm to 10,000 ppm, it is possible to suppress satisfactorily the evolution of hydrogen sulfide gases which are normally generated during the production, storage and transfer of the hydrocarbon or water. Preferably, the amount of diamine added to the hydrocarbon or water ranges from about 100 ppm to about 1,000 ppm.

In accordance with the present invention, there is provided an effective and economical process for scavenging hydrogen sulfide in water, liquid hydrocarbons or in dry or aqueous, qaseous mixtures of hydrogen sulfide and low boiling hydrocarbons, such as methane, ethane, propane, etc., emitted during the removing of crude oil from the ground, the storage of the oil, the separation of the oil from oil well water, waste water, transport of the oil, and the oil refining. Also, the invention is useful in scavenging hydrogen sulfide in residual oil fuels. The hydrogen scavenging of the present invention is accomplished by intimately mixing or contacting the hydrogen sulfide-containing substance with an effective hydrogen sulfide scavenging amount of the aforementioned diamino methane.

DETAILED DESCRIPTION OF THE INVENTION

The present invention comprises a method including the step of bringing into reactive intimate contact water or a hydrocarbon, such as crude oil, petroleum residual fuel and the like with certain diaminomethanes. Instead of contacting the diaminomethane with the water or hydrocarbon, the diaminomethane can be contacted with wet or dry gaseous mixtures of hydrogen sulfide and hydrocarbon vapors, such as is found in natural gas or obtained in the drilling, removal from the ground, storage, transport, and processing of crude oil.

The composition of the present invention is generally comprised of water or a hydrocarbon and an effective amount of a diaminomethane having the following general structural formula:

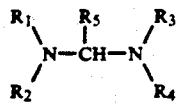

wherein $R_1$, $R_2$, $R_3$, and $R_4$ are each independently an alkyl radical containing 1 to 14 carbon atoms, $(CH_2)_n$—$OR_6$ or cycloalkyl having 5 or 6 carbon atoms and $R_5$ is hydrogen or methyl. $R_6$ is an alkyl having 1 to 5 carbon atoms and n is an integer of 1 to 5. Additionally, $R_1$, $R_2$, $R_3$ and $R_4$ can be a lower alkylene wherein $R_1$ and $R_2$ alone and/or wherein $R_3$ and $R_4$, are joined together to form a five or six member saturated heterocyclic ring. Such ring can also contain hetero atoms such as N, O, or S in addition to the N to which $R_1$ and $R_2$ and/or $R_3$ and $R_4$ are respectively joined. The heterocyclic compounds of the present invention have the following structure.

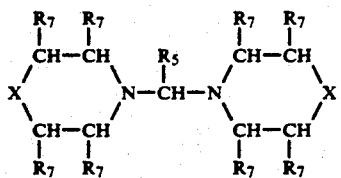

where X is selected from the group of N, O, S or —$CR_8$ and $R_5$ is hydrogen or methyl and $R_7$ is hydrogen or $C_1$-$C_4$ alkyl and $R_8$ is hydrogen or $C_1$-$C_4$ alkyl.

If the invention is used with petroleum residua, the diamine is incorporated in the residua after the residua are removed as a bottoms product from the refining of crude oil. The diamine should be thoroughly mixed in the residua. Thus, thorough incorporation of the diamine is preferably accomplished while the residua are at a temperature sufficiently high for the residua to have a suitable mixing viscosity but at a temperature sufficiently low to prevent thermal degradation of the additive. Often residua are too viscous at room temperature for the diamine to be conveniently dispersed evenly throughout the residua. The incorporation of the additive to suppress the evolution of hydrogen sulfide gases should be made before the residua are stored or transported.

The diamines useful in the present invention can be prepared by reacting a suitable aldehyde and a suitable secondary amine or mixtures in a known and conventional manner. Thus, the diamines can be obtained by reacting a secondary amine typically having the formula:

in which $R_1$, $R_2$, $R_3$ and $R_4$ are as defined above with an aldehyde having the formula:

in which $R_5$ is as defined above. The secondary amine and the aldehyde are preferably combined in a mole ratio of about 2:1, i.e., the stoichiometric amount for the formation of diaminomethane with substantially no side products.

The diamines useful in the subject invention can be prepared under conventional dehydrating conditions whereby water is removed by any suitable means. Typically, the aldehyde is added to the secondary amine and the condensate recovered by mechanically separating as much of the water of reaction as possible and distilling off the remaining water. The reaction is generally exothermic and the exotherm should be controlled particularly when the aldehyde is other than formaldehyde to prevent formation of enamines. The subject diamines can be formed from mixtures of different aldehydes and/or mixtures of different secondary amines.

The amount of the diamine as herein defined effective to inhibit hydrogen sulfide gas liberation will vary, depending on various factors, for example, the particular material to be treated and conditions of production, storage, or transport. In practice, at least an amount of about 10 ppm additive based on the weight of the water or hydrocarbon is used and preferably an amount of at least 100 ppm is used. Amounts of diamine exceeding 10,000 ppm can be employed, but, in general, there is usually no commercial or technical advantage in doing so.

TEST PROCEDURE

In the following examples, the effectiveness of the diamine additive is determined by the following hydrogen sulfide gas evolution analysis. Into a metal container, the diamine additive and 500 grams of sample residua are charged at ambient temperature. After capping the container, the container and contents therein are heated in a constant temperature bath for 60 minutes at 180° F. The container is then removed from the bath and shaken in a shaker for 30 seconds. Thereafter, the container and contents are again heated at 180° F. for another 30 minutes. After the first shaking operation, the container and the contents are shaken again for 30 seconds. Immediately, after the second shaking, the cap is replaced with a one hole stopper. Connected to the stopper hole is a Dräger tube whose other end is connected to a Dräger gas detector pump. With one stroke of the pump, a gas sample is withdrawn through the tube. The tube is removed from the container. Thereafter, two strokes of pure air are brought through the tube allowing the absorbed hydrogen sulfide to convert quantitatively. The length of the discoloration in the tube blackened by $H_2S$ corresponds to the hydrogen sulfide concentration in the vapor above the liquid in the container. Alternatively, the headspace gas after the second shaking can be analyzed using a gas chromatograph connected to a mass spectrometer or other suitable device for quantitatively measuring H2S.

In the following examples, all percentages are given on a weight basis unless otherwise indicated.

EXAMPLE 1

Residuum from a large refining plant near St. Louis, Mo., which is transported to a ship on the West Coast of the United States generates unacceptable quantities of hydrogen sulfide gas. The gas becomes an environmental problem when the residuum is unloaded onto the ship. It is found that by adding an effective quantity (250 ppm) of a diamine having the following general formula the quantity of hydrogen gas emitted is substantially reduced:

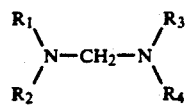

wherein each of $R_1$, $R_2$, $R_3$, and $R_4$ is n-butyl.

EXAMPLE 2

In the laboratory, various diamines at additive levels of 100 ppm and 250 ppm were tested for their efficacy to suppress the liberation of hydrogen sulfide gas in residua using the above test procedure as above described. The residuum employed in the tests was a straight run residue from an atmospheric crude unit. The results of such tests have been summarized in the table on the following page:

added dropwise. The resulting mixture was stirred at room temperature for 15 minutes. Thereafter, water was removed by evaporation. The product was identified as bis(dibutylamino)methane.

The diamine in Test No. 3 was obtained by heating two moles of morpholine to 80° C. One mole of formaldehyde in the form of a 37% aqueous solution was then added dropwise. The resulting mixture was heated at 80° C. for one hour. Thereafter, all water was distilled off leaving a clear oil product which was identified as bis(morpholino)methane.

The diamine of Test No. 4 was obtained by combining two moles of N-ethylcyclohexylamine and one mole of formaldehyde in the form of a 37% aqueous solution. The resulting mixture was stirred at room temperature for one hour and thereafter heated for one hour (at 80° C.). Water was then distilled off. The product was identified as bis(N-ethylcyclohexylamino)methane.

The diamine of Test No. 5 was obtained as follows. Two moles of morpholine were cooled in ice and one mole of acetaldehyde was added dropwise to the cooled morpholine. The reaction was notably exothermic. After all the aldehyde had been added, the resulting mixture was stirred 15 minutes at room temperature. The mixture was subjected to rotary evaporation at room temperature and at 20 mm $H_g$ pressure to remove unreacted aldehyde and water. The resulting product was a viscous yellow oil and was identified as 1,1 bis(-morpholino)ethane.

The diamine of Test No. 6 was prepared by heating two moles of 3-methylpiperidine and one mole of formaldehyde in the form of 37% aqueous solution with stirring at 80° C. for 30 minutes. Water was then distilled off. The product was identified as bis(3-methyl-

TABLE

| Test No. | Diaminomethane | Amount, ppm | H2S in Head Space, ppm | % H2S Reduction |
|---|---|---|---|---|
| 1. | blank (no additive) | — | 2500 | — |
| 2. | n-butyl, n-butyl, n-butyl, n-butyl N—CH2—N | 100<br>250 | 2196<br>1521 | 12.2<br>39.2 |
| 3. | (morpholino)—CH2—(morpholino) | 100<br>250 | 1489<br>1347 | 40.4<br>46.1 |
| 4. | (cyclohexyl)(C2H5)N—CH2—N(C2H5)(cyclohexyl) | 100<br>250 | 1687<br>1293 | 32.5<br>48.3 |
| 5. | (morpholino)—CH(CH3)—(morpholino) | 100<br>250 | 1378<br>1030 | 44.9<br>58.8 |
| 6. | (3-methylpiperidino)—CH2—(3-methylpiperidino) | 100<br>250 | 1291<br>814 | 48.4<br>67.4 |

The diamine in Test No. 2 was obtained by heating two moles of dibutylamine to 80° C. One mole of formaldehyde in the form of 37% aqueous solution was then piperidino)methane.

As various changes can be made in the above described invention without departing from the scope of the invention, it is intended that the above description shall be interpreted as illustrative only and not in a limiting sense.

What is claimed is:

1. A process of inhibiting the liberation of hydrogen sulfide gas from a material comprising water or a hydrocarbon containing dissolved hydrogen sulfide comprising adding to said material a sufficient amount of the following diaminomethane compound to inhibit hydrogen sulfide gas evolution:

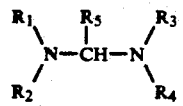

wherein $R_1$, $R_2$, $R_3$, and $R_4$ are independently an alkyl radical containing one to 14 carbon atoms, $(CH_2)_n$—$OR_6$ or cycloalkyl having 5 or 6 carbon atoms or wherein $R_1$ and $R_2$ and/or $R_3$ and $R_4$ are alkylene groups joined together with their adjacent N to form a heterocyclic ring and wherein $R_5$ is hydrogen or methyl and $R_6$ is an alkyl having 1 to 5 carbon atoms and n is an integer of 1 to 5.

2. The process of claim wherein the diaminomethane compound is present in the amount of about 10 ppm to 10,000 ppm.

3. The process of claim 1 wherein each of $R_1$, $R_2$, $R_3$, and $R_4$ are alkyl radicals of 1 to 9 carbon atoms.

4. The process of claim 3 wherein the diaminomethane compound is present in an amount of about 10 ppm to 10,000 ppm.

5. The process of claim 1 wherein each of the alkyl radicals are n-butyl radicals.

6. The process of claim 5 wherein the diaminomethane compound is present in the amount of 10 ppm to 10,000 ppm.

7. The process of claim 1 wherein the diaminomethane compound is present in the amount of 100 ppm to 1,000 ppm.

8. The process of claim 3 wherein the diaminomethane compound is present in the amount of 100 ppm to 1,000 ppm.

9. The process of claim 5 wherein the diaminomethane compound is present in the amount of 100 ppm to 1,000 ppm.

10. The process of claim 1 wherein $R_1$ and $R_2$ and/or $R_3$ and $R_4$ are ethylene groups joined to form a heterocyclic structure having a hetero atom selected from the group consisting of N, O, or S in addition to the N to which $R_1$ and $R_2$ and/or $R_3$ and $R_4$ are respectively joined.

11. The process of claim 10 wherein the diaminomethane compound is present in the amount of about 10 ppm to 10,000 ppm.

12. The process of claim 10 wherein the diaminomethane compound is present in the amount of about 100 ppm to 1,000 ppm.

13. The process of claim wherein the diaminomethane compound has the chemical structure of

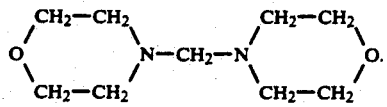

14. The process of claim 1 wherein the diaminomethane compound has the chemical structure of

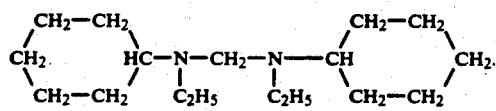

15. The process of claim 1 wherein the diaminomethane compound has the chemical structure of

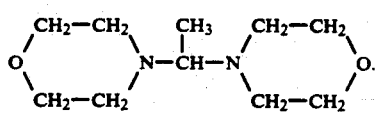

16. The process of claim 1 wherein the diaminomethane compound has the chemical structure of

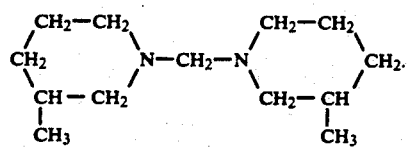

17. A composition comprising
 a. a material comprising water or a hydrocarbon, and
 b. a sufficient amount of the following diaminomethane compound to inhibit hydrogen sulfide gas liberation:

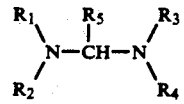

wherein $R_1$, $R_2$, $R_3$, and $R_4$ are independently an alkyl moiety containing 1 to 14 carbon atoms, $(CH_2)_n$—$OR_6$ or cycloalkyl having 5 or 6 carbon atoms or wherein $R_1$ and $R_2$ and/or $R_3$ and $R_4$ are alkylene groups joined together with their adjacent N to form a heterocyclic ring and $R_5$ is hydrogen or methyl and $R_6$ is an alkyl having 1 to 5 carbon atoms and n is an integer of 1 to 5.

18. The composition of claim 17 wherein the diaminomethane compound is present in the amount of about 10 ppm to 10,000 ppm.

19. The composition of claim 17 wherein each of the alkyl moieties contain 1 to 9 carbon atoms.

20. The composition of claim 19 wherein the diaminomethane compound is present in an amount of about 10 ppm to 10,000 ppm.

21. The composition of claim 17 wherein each of $R_1$, $R_2$, $R_3$, and $R_4$ are n-butyl radicals and $R_5$ is hydrogen.

22. The composition of claim 21 wherein the diaminomethane compound is present in the amount of 10 ppm to 10,000 ppm.

23. The composition of claim 17 wherein the diaminomethane compound is present in the amount of 100 ppm to 1,000 ppm.

24. The composition of claim 19 wherein the diaminomethane compound is present in the amount of 100 pp to 1,000 ppm.

25. The composition of claim 21 wherein the diaminomethane compound is present in the amount of 100 pp to 1,000 ppm.

26. The composition of claim 17 wherein $R_1$ and $R_2$ and/or $R_3$ and $R_4$ are ethylene groups joined to form a heterocyclic structure having a hetero atom selected from the group consisting of N, O, or S in addition to the N to which $R_1$ and $R_2$ and/or $R_3$ and $R_4$ are respectively joined.

27. The composition of claim 26 wherein the diaminomethane compound is present in the amount of about 10 ppm to 10,000 ppm.

28. The composition of claim 26 wherein the diaminomethane compound is present in the amount of about 100 ppm to 1,000 ppm.

29. The composition of claim 17 wherein the diaminomethane compound has the chemical structure of

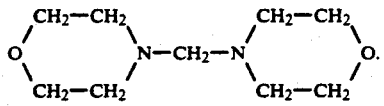

30. The composition of claim 17 wherein the diaminomethane compound has the chemical structure of

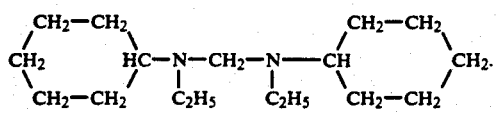

31. The composition of claim 17 wherein the diaminomethane compound has the chemical structure of

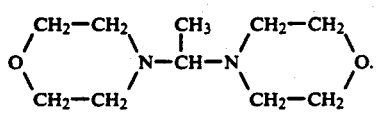

32. The composition of claim 17 wherein the diaminomethane compound has the chemical structure of

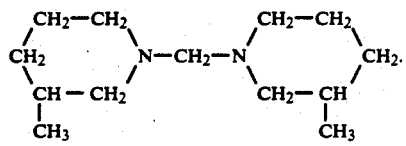

33. The process of claim 1 wherein said material is a hydrocarbon.

34. The process of claim 33 wherein said hydrocarbon is petroleum residua.

35. The composition of claim 17 wherein said material is a hydrocarbon.

36. The process of claim 35 wherein said hydrocarbon is petroleum residua.

* * * * *

UNITED STATES PATENT AND TRADEMARK OFFICE
CERTIFICATE OF CORRECTION

PATENT NO. : 5,074,991

DATED : December 24, 1991

INVENTOR(S) : Jerry J. Weers

It is certified that error appears in the above-identified patent and that said Letters Patent is hereby corrected as shown below:

In Claim 26, Column 10, line 31, delete the word "process" and insert therefor --composition--.

Signed and Sealed this

First Day of June, 1993

Attest:

MICHAEL K. KIRK

*Attesting Officer*    Acting Commissioner of Patents and Trademarks

UNITED STATES PATENT AND TRADEMARK OFFICE
CERTIFICATE OF CORRECTION

PATENT NO. : 5,074,991
DATED : December 24, 1991
INVENTOR(S) : Jerry J. Weers

It is certified that error appears in the above-indentified patent and that said Letters Patent is hereby corrected as shown below:

In Claim 36, column 10, line 31, delete the word "process" and insert therefor --composition--.

This certificate supersedes Certificate of Correction issued June 1, 1993.

Signed and Sealed this

Thirty-first Day of December, 1996

Attest:

BRUCE LEHMAN

Attesting Officer  Commissioner of Patents and Trademarks

(12) REEXAMINATION CERTIFICATE (4336th)

United States Patent
Weers

(10) Number: US 5,074,991 C1
(45) Certificate Issued: May 8, 2001

(54) SUPPRESSION OF THE EVOLUTION OF HYDROGEN SULFIDE GASES

(75) Inventor: Jerry J. Weers, Ballwin, MO (US)

(73) Assignee: Baker Hughes Incorporated, Houston, TX (US)

Reexamination Requests:
No. 90/003,346, Feb. 28, 1994
No. 90/003,873, Jun. 23, 1995

Reexamination Certificate for:
Patent No.: 5,074,991
Issued: Dec. 24, 1991
Appl. No.: 07/525,796
Filed: May 18, 1990

Certificate of Correction issued Jun. 1, 1993.

Certificate of Correction issued Dec. 31, 1996.

Related U.S. Application Data

(63) Continuation-in-part of application No. 07/310,420, filed on Feb. 13, 1989, now abandoned.

(51) Int. Cl.$^7$ ................................. C01G 29/20
(52) U.S. Cl. .............. 208/236; 208/14; 208/47; 208/348; 208/370; 44/333; 44/340; 44/353; 44/432; 44/433; 210/749; 210/750; 210/757; 210/758; 252/148; 252/390; 252/394
(58) Field of Search ............... 208/236, 14, 47, 208/348, 370; 44/333, 340, 353; 210/757, 758

(56) References Cited

U.S. PATENT DOCUMENTS

| | | | |
|---|---|---|---|
| 1,151,255 | 8/1915 | Ferguson | 252/396 |
| 1,470,225 | 10/1923 | Holmes . | |
| 1,594,983 | 8/1926 | Somerville | 252/403 |
| 1,771,985 | 8/1930 | Calcott et al. . | |
| 1,789,927 | 1/1931 | Murrill et al. | 252/401 |
| 1,805,953 | 5/1931 | Morton . | |
| 1,809,041 | 6/1931 | Jenkins et al. | 252/389.62 |
| 1,813,884 | 7/1931 | Behm | 208/291 |
| 1,895,955 | 1/1933 | Wygodsky | 44/592 |
| 1,908,705 | 5/1933 | Jaeger . | |
| 1,974,311 | 9/1934 | Levine . | |
| 2,009,818 | 7/1935 | Salzberg et al. | 44/9 |
| 2,018,715 | 10/1935 | Fulton | 196/23 |
| 2,019,559 | 11/1935 | Burke | 252/5 |
| 2,055,810 | 9/1936 | Bartram | 44/9 |
| 2,068,850 | 1/1937 | Ellis | 196/39 |
| 2,080,732 | 5/1937 | Morrell | 196/36 |
| 2,098,059 | 11/1937 | Morrell | 196/36 |
| 2,113,599 | 4/1938 | Musselman | 87/9 |
| 2,114,852 | 4/1938 | McKittrick | 196/13 |
| 2,196,963 | 4/1940 | Fuller | 87/9 |
| 2,238,201 | 4/1941 | Wilson et al. | 196/32 |
| 2,264,894 | 12/1941 | Shoemaker et al. | 44/9 |
| 2,265,051 | 12/1941 | Adams | 44/9 |
| 2,279,561 | 4/1942 | Dietrich | 252/50 |
| 2,319,630 | 5/1943 | Prutton et al. | 252/46 |
| 2,355,599 | 8/1944 | Walker | 252/146 |
| 2,413,972 | 1/1947 | Herlocker et al. | 252/51.5 |
| 2,426,318 | 8/1947 | Menaul | 252/8.55 |
| 2,466,517 | 4/1949 | Blair et al. | 252/8.55 |

(List continued on next page.)

FOREIGN PATENT DOCUMENTS

| | | |
|---|---|---|
| 771181 | 11/1967 | (CA) . |
| 141 324 | 5/1903 | (DE) . |
| 320 378 | 4/1920 | (DE) . |
| 439 608 | 1/1927 | (DE) . |
| 486 022 | 11/1929 | (DE) . |
| 26 51 465 | 5/1978 | (DE) ............ A61L/13/00 |
| 636 332 | 4/1928 | (FR) . |
| 269840 | 1/1928 | (GB) . |
| 798062 | 7/1958 | (GB) . |
| 1325913 | 8/1973 | (GB) . |
| 1374340 | 11/1974 | (GB) . |
| 1392171 | 4/1975 | (GB) . |
| 2 245 588 | 1/1992 | (GB) . |
| 1414859 | 3/1987 | (RU) . |

OTHER PUBLICATIONS

Brooks, "The Chemistry of Gasolines Particularly with Respect to Gum Formation and Discoloration", *Industrial and Engineering Chemistry*, Nov. 1926, vol. 18, No. 11, pp. 1198–1203.

General Chemistry, Saunders College Publishing, Philadelphia, 1981, p. 273.*

J. Frederic Walker, Formaldehyde (3d ed. 1964) pp. 359–361.

"Determination of Type of Sulfer Compounds in Petroleum Distillates," Report of Investigations, United States Department of the Interior and Bureau of Mines (1941) pp. 1–60.

"Thermal Stability of High Sulfur Crude Oils," 45 Industrial and Engineering Chemistry (1953) pp. 2706–2710.

Fred C. Riesenfeld, Arthur L. Kohl, "Gas Purification", 2d ed., Gulf Publishing Co., Houston, TX, 1974 (pp. 691–700).

*Cooling Lubricant Preservatives*, Diehl, K.–H. and Siegert, W., Tribologie + Schmierungstechnik, vol. 31, No. 4, pp. 220–225 (1984).

*Modern Petroleum Technology*, Ed G D Hobson, 1973 pp. 658,659.*

*Primary Examiner*—Helane E. Myers

(57) ABSTRACT

Hydrogen sulfide gas evolution from water or hydrocarbons, especially during storage or transport of petroleum residua is suppressed by the incorporation of an effective amount of a diamine of the formula

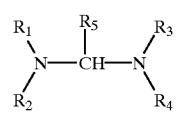

wherein $R_1$, $R_2$, $R_3$, and $R_4$ are independently an alky radical containing 1 to 14 carbon atoms, $(CH_2)_n$—$OR_6$ or cycloalkyl containing 5 or 6 carbon atoms and $R_5$ is hydrogen or methyl. $R_1$ and $R_2$ and $R_3$ and $R_4$ can be alkylene groups joined together with their respective adjacent N to form a heterocyclic ring. $R_6$ is hydrogen or an alkyl radical having 1 to 5 carbon atoms and n is an integer of 1 to 5.

U.S. PATENT DOCUMENTS

| | | | |
|---|---|---|---|
| 2,485,309 | 10/1949 | Nunn | 252/392 |
| 2,496,444 | 2/1950 | Cook | 44/77 |
| 2,496,594 | 2/1950 | Moyer et al. | 252/8.55 |
| 2,496,595 | 2/1950 | Moyer et al. | 252/8.55 |
| 2,496,596 | 2/1950 | Meyer et al. | 252/8.55 |
| 2,501,602 | 3/1950 | Hartough et al. | 260/570.9 |
| 2,514,508 | 7/1950 | Nunn | 252/392 |
| 2,560,632 | 7/1951 | Carnell . | |
| 2,560,633 | 7/1951 | Stedman | 44/72 |
| 2,567,173 | 9/1951 | Arundale et al. | 196/40 |
| 2,567,174 | 9/1951 | Arundale et al. | 208/191 |
| 2,567,175 | 9/1951 | Arundale et al. | 196/31 |
| 2,569,216 | 9/1951 | Arundale | 260/674 |
| 2,578,292 | 12/1951 | Donovan | 260/510 |
| 2,589,114 | 3/1952 | Murray | 196/27 |
| 2,589,209 | 3/1952 | Kardos et al. | 260/72 |
| 2,596,273 | 5/1952 | Moyer et al. | 252/8.55 |
| 2,596,425 | 5/1952 | Moyer et al. | 252/8.55 |
| 2,605,223 | 7/1952 | Case | 252/8.55 |
| 2,606,873 | 8/1952 | Cardwell et al. | 252/148 |
| 2,616,832 | 11/1952 | Browder et al. | 196/29 |
| 2,641,538 | 6/1953 | Thompson et al. | 44/63 |
| 2,643,977 | 6/1953 | Hughes | 252/8.55 |
| 2,643,978 | 6/1953 | Hughes | 252/8.55 |
| 2,646,400 | 7/1953 | Hughes | 252/8.55 |
| 2,700,652 | 1/1955 | Menaul | 252/8.55 |
| 2,701,187 | 2/1955 | Andress | 44/63 |
| 2,798,798 | 7/1957 | Marsh et al. | 44/72 |
| 2,849,301 | 8/1958 | Gee | 44/64 |
| 2,852,436 | 9/1958 | Spindt et al. | 196/24 |
| 2,886,521 | 5/1959 | Gislon et al. | 208/197 |
| 2,906,611 | 9/1959 | Schnaith et al. | 44/72 |
| 2,906,706 | 9/1959 | King | 208/231 |
| 2,962,442 | 11/1960 | Andress | 252/51.5 |
| 2,984,550 | 5/1961 | Chamot . | |
| 2,985,523 | 5/1961 | Chamot | 44/73 |
| 3,013,963 | 12/1961 | Ferrera et al. . | |
| 3,013,964 | 12/1961 | Ferrera et al. . | |
| 3,013,965 | 12/1961 | Ferrera et al. . | |
| 3,025,313 | 3/1962 | Gunderson | 260/404.5 |
| 3,036,003 | 5/1962 | Verdol | 252/33.4 |
| 3,065,206 | 11/1962 | Chamot | 260/72.5 |
| 3,068,171 | 12/1962 | Ferrera et al. . | |
| 3,077,454 | 2/1963 | Monroe et al. | 252/148 |
| 3,094,490 | 6/1963 | Gardner et al. | 252/149 |
| 3,098,827 | 7/1963 | Kirkpatrick et al. | 252/341 |
| 3,114,702 | 12/1963 | Thompson | 208/348 |
| 3,127,355 | 3/1964 | Groote et al. | 252/392 |
| 3,184,294 | 5/1965 | Chamot | 44/62 |
| 3,197,510 | 7/1965 | Cyba | 260/584 |
| 3,208,859 | 9/1965 | Coffield | 99/163 |
| 3,209,030 | 9/1965 | Bicek | 260/574 |
| 3,211,653 | 10/1965 | O'Halloran | 252/50 |
| 3,212,867 | 10/1965 | Ockerbloom | 44/71 |
| 3,236,835 | 2/1966 | Rabourn | 260/239 |
| 3,269,810 | 8/1966 | Chamot | 44/62 |
| 3,317,291 | 5/1967 | Marsh et al. | 44/72 |
| 3,326,975 | 6/1967 | Lappin | 260/561 |
| 3,351,662 | 11/1967 | Chamot | 260/566 |
| 3,390,073 | 6/1968 | Godar et al. | 208/48 |
| 3,398,170 | 8/1968 | Cyba | 260/439 |
| 3,409,543 | 11/1968 | Urban et al. | 208/234 |
| 3,485,603 | 12/1969 | Balash | 44/63 |
| 3,486,866 | 12/1969 | Stromberg et al. | 44/72 |
| 3,507,787 | 4/1970 | Pratt et al. | 210/54 |
| 3,510,282 | 5/1970 | Seffens | 44/63 |
| 3,514,410 | 5/1970 | Engle et al. | 252/87 |
| 3,535,260 | 10/1970 | Singh | 252/189 |
| 3,597,173 | 8/1971 | Wallace et al. | 44/64 |
| 3,640,692 | 2/1972 | Rakow et al. | 44/63 |
| 3,654,346 | 4/1972 | Godar et al. | 260/482 R |
| 3,669,613 | 6/1972 | Knox et al. | 21/2.7 |
| 3,726,882 | 4/1973 | Traise et al. | 260/296 |
| 3,816,333 | 6/1974 | King et al. | 252/389 |
| 3,819,328 | 6/1974 | Go | 21/2.5 R |
| 3,927,994 | 12/1975 | Romans | 44/63 |
| 3,928,211 | 12/1975 | Browning | 252/8.5 B |
| 3,929,635 | 12/1975 | Buriks et al. | 210/54 |
| 4,013,720 | 3/1977 | Nicholson et al. | 260/570.5 |
| 4,131,551 | 12/1978 | Thompson et al. | 252/33 |
| 4,157,308 | 6/1979 | Wilgus et al. | 252/42.7 |
| 4,163,646 | 8/1979 | Oude Alink et al. | 44/73 |
| 4,167,526 | 9/1979 | Farthing et al. | 260/570.5 P |
| 4,175,044 | 11/1979 | Wilgus et al. | 252/42.7 |
| 4,178,259 | 12/1979 | King | 252/42.7 |
| 4,179,549 | 12/1979 | Buriks et al. | 525/374 |
| 4,186,105 | 1/1980 | Bonsall et al. | 252/400 R |
| 4,188,359 | 2/1980 | Quinlan | 422/12 |
| 4,224,150 | 9/1980 | Buriks et al. | 210/735 |
| 4,230,839 | 10/1980 | Buriks | 526/75 |
| 4,244,703 | 1/1981 | Kaspaul | 44/56 |
| 4,310,472 | 1/1982 | Buriks et al. | 260/465.4 |
| 4,341,887 | 7/1982 | Buriks et al. | 526/263 |
| 4,350,600 | 9/1982 | Sharp et al. | 252/8.55 E |
| 4,368,059 | 1/1983 | Doerges et al. | 55/73 |
| 4,396,517 | 8/1983 | Gemmill et al. | 252/51.5 R |
| 4,400,178 | 8/1983 | Hoke | 44/72 |
| 4,402,842 | 9/1983 | Horodysky et al. | 252/47.5 |
| 4,404,167 | 9/1983 | Rozenfeld et al. | 422/12 |
| 4,417,904 | 11/1983 | Burns et al. | 44/72 |
| 4,460,482 | 7/1984 | Wu | 252/8.55 E |
| 4,485,007 | 11/1984 | Tam et al. | 208/221 |
| 4,492,658 | 1/1985 | Bellos | 260/455 A |
| 4,508,541 | 4/1985 | Kaufman et al. | 44/71 |
| 4,537,601 | 8/1985 | Naiman | 44/62 |
| 4,551,152 | 11/1985 | Sung | 44/78 |
| 4,594,147 | 6/1986 | Roof et al. | 208/207 |
| 4,631,138 | 12/1986 | Johns et al. | 252/8.555 |
| 4,663,124 | 5/1987 | Incorvia | 422/7 |
| 4,757,102 | 7/1988 | Ravichandran et al. | 524/95 |
| 4,784,797 | 11/1988 | Treybig et al. | 252/392 |
| 4,789,523 | 12/1988 | Schilling et al. | 422/12 |
| 4,802,973 | 2/1989 | Hodgson et al. | 208/207 |
| 4,806,229 | 2/1989 | Ferguson et al. | 208/47 |
| 4,900,427 | 2/1990 | Weers et al. . | |
| 4,900,458 | 2/1990 | Schroeder et al. | 252/8.555 |
| 4,938,925 | 7/1990 | Peterson et al. | 422/12 |
| 4,957,640 | 9/1990 | Treybig et al. | 252/8.555 |
| 4,978,366 | 12/1990 | Weers | 44/334 |
| 4,978,512 | 12/1990 | Dillon | 423/226 |

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 3–12 and 14–36 is confirmed.

Claims 2 and 13 are determined to be patentable as amended.

New claims 37–50 are added and determined to be patentable.

2. The process of claim *1* wherein the diaminomethane compound is present in the amount of about 10 ppm to 10,000 ppm.

13. The process of claim *1* wherein the diaminomethane compound has the chemical structure of

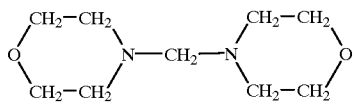

*37. A process of inhibiting the liberation of hydrogen sulfide gas from a material comprising a liquid hydrocarbon containing hydrogen sulfide, comprising adding to said material a sufficient amount of the following diaminomethane compound to inhibit hydrogen sulfide gas evolution:*

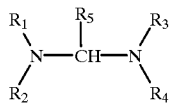

*wherein $R_1$, $R_2$, $R_3$ and $R_4$ are independently an alkyl radical containing one to 14 carbon atoms, $(CH_2)_n$—$OR_6$ or cycloalkyl having 5 or 6 carbon atoms or wherein $R_1$ and $R_2$ and/or $R_3$ and $R_4$ are alkylene groups joined together with their adjacent N to form a heterocyclic ring and wherein $R_5$ is hydrogen or methyl and $R_6$ is an alkyl having 1 to 5 carbon atoms and n is an integer of 1 to 5.*

*38. The process of claim 37 wherein each of $R_1$, $R_2$, $R_3$ and $R_4$ are butyl radicals and $R_5$ is hydrogen.*

*39. The process of claim 38 wherein the diaminomethane compound is present in the amount of 10 ppm to 10,000 ppm.*

*40. The process of claim 38 wherein the diaminomethane compound is present in the amount of 100 ppm to 1,000 ppm.*

*41. The process of claim 37 wherein said hydrocarbon is petroleum residua.*

*42. A composition comprising:*
  *a. a liquid hydrocarbon material, and*
  *b. a sufficient amount of the following diaminomethane compound to inhibit hydrogen sulfide gas liberation:*

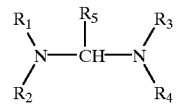

*wherein $R_1$, $R_2$, $R_3$, and $R_4$ are independently an alkyl moiety containing 1 to 14 carbon atoms, $(CH_2)_n$—$OR_6$ or cycloalkyl having 5 or 6 carbon atoms or wherein $R_1$ and $R_2$ and/or $R_3$ and $R_4$ are alkylene groups joined together with their adjacent N to form a heterocyclic ring and $R_5$ is hydrogen or methyl and $R_6$ is an alkyl having 1 to 5 carbon atoms and n is an integer of 1 to 5.*

*43. The composition of claim 42 wherein each of $R_1$, $R_2$, $R_3$, and $R_4$ are n-butyl radicals and $R_5$ is hydrogen.*

*44. The composition of claim 43 wherein the diaminomethane compound is present in the amount of 10 ppm to 10,000 ppm.*

*45. The composition of claim 43 wherein the diaminomethane compound is present in the amount of 100 pp to 1,000 ppm.*

*46. The composition of claim 42 wherein said hydrocarbon is petroleum residua.*

*47. The process of claim 33 wherein the hydrocarbon material is bunker fuel oil.*

*48. The process of claim 33 wherein the hydrocarbon material is No. 6 fuel oil.*

*49. The process of claim 33 wherein the hydrocarbon material is fuel oil C.*

*50. The process of claim 33 wherein the hydrocarbon material is marine fuel oil.*

* * * * *